June 12, 1962    J. A. BERNARD    3,038,354
SPEED RESPONSIVE TRANSMISSION AND CLUTCH
Filed May 24, 1960    2 Sheets-Sheet 2
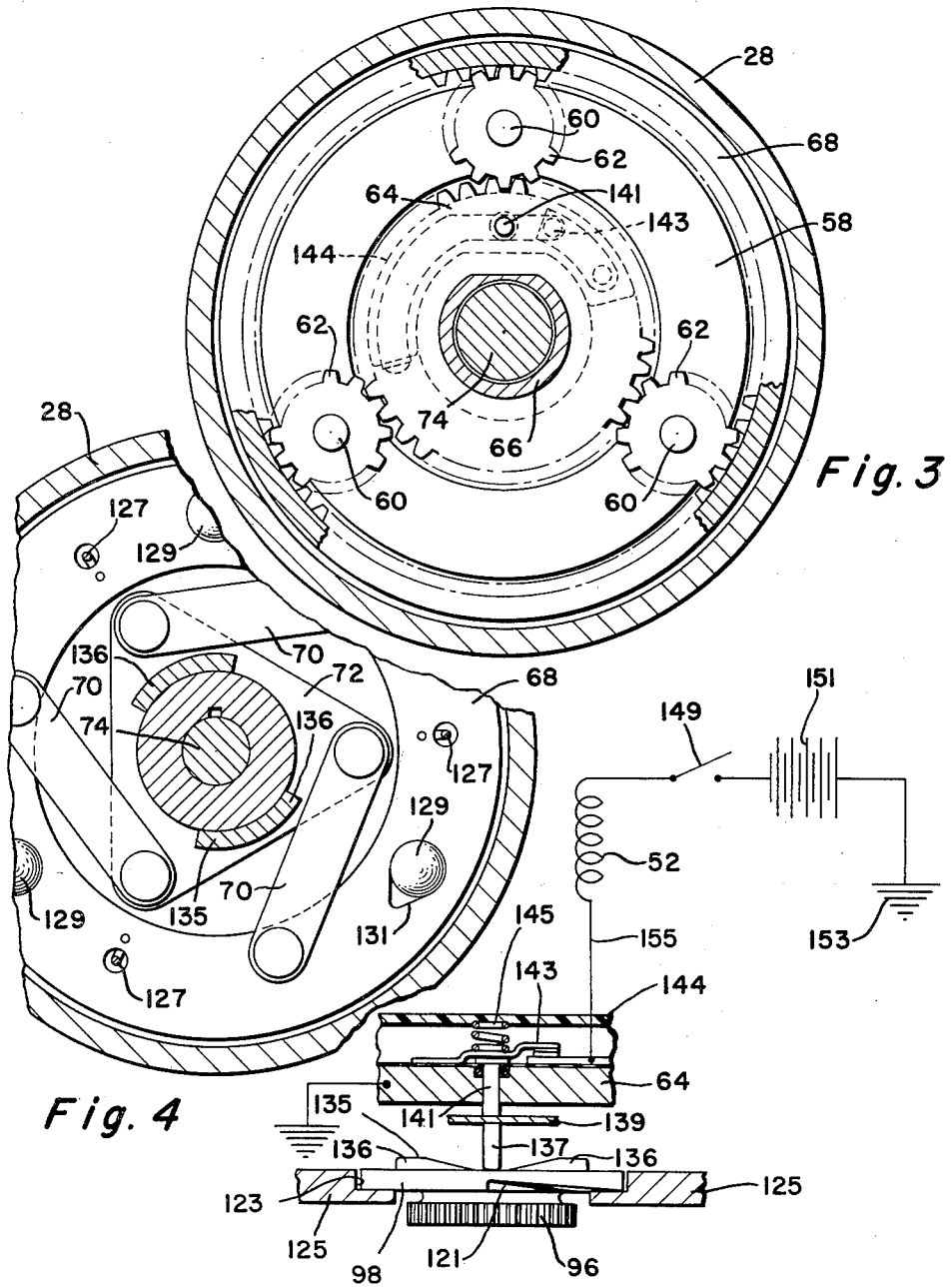
INVENTOR.
James A. Bernard
BY Carl A. Stickel
His Attorney

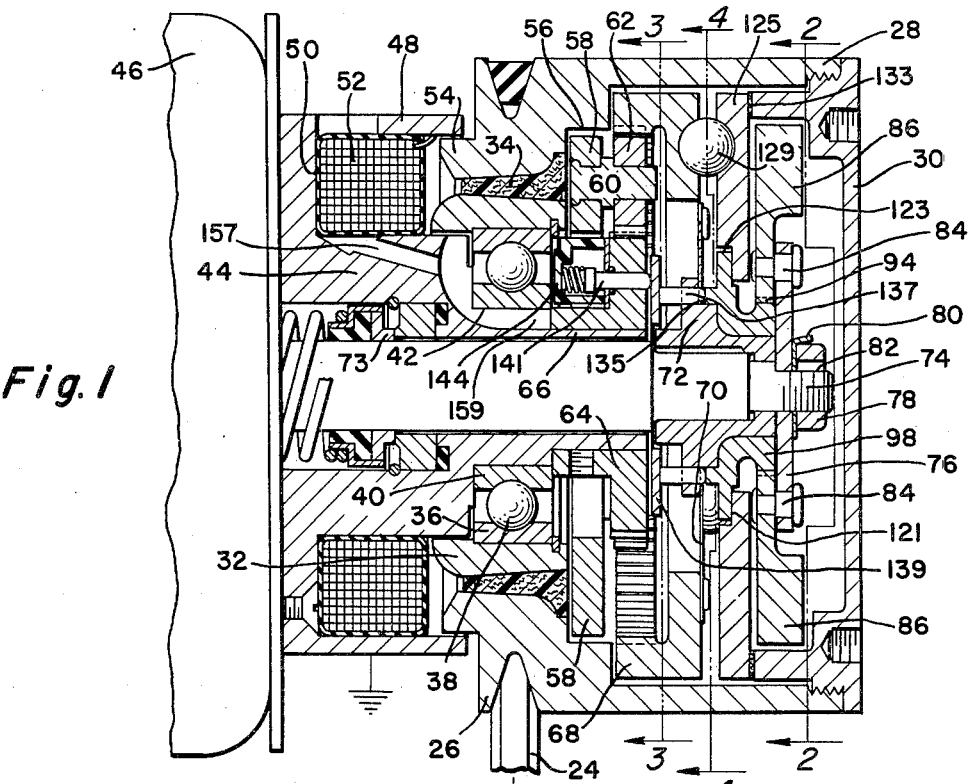

United States Patent Office 3,038,354
Patented June 12, 1962

3,038,354
SPEED RESPONSIVE TRANSMISSION
AND CLUTCH
James A. Bernard, Dayton, Ohio, assignor to General Motors Corporation, Detroit, Mich., a corporation of Delaware
Filed May 24, 1960, Ser. No. 31,367
10 Claims. (Cl. 74—752)

This invention pertains to refrigerating apparatus in a general way but more particularly to a combined multi-speed transmission and clutch, such as may be used for driving an accessory from the driving engine of a vehicle. As one example, the combined transmission and clutch may be used to drive the compressor of an automotive air conditioning system from the driving engine of the automobile.

Since the speed of the driving engine varies from the idling speed to speeds governed by city and intercity traffic as well as road conditions, it is difficult to maintain the ideal speed for the accessory which is driven from the automobile engine.

When an automotive compressor is driven from the engine of an automobile for air conditioning a car, the initial requirements are usually the greatest because of the desire for a quick pull down in temperature after leaving a parking space in which the car has been heated in the sun. Usually, the car will continue through heavy traffic at low speeds. It is therefore desirable at such times that the compressor speed be high relative to the engine speed so that greater refrigeration can be obtained under congested city traffic conditions which often prevail adjacent to parking areas. However, if this driving ratio were maintained under high driving speeds, the compressor speed would be excessive and far beyond the refrigeration requirements. It is also desirable to disconnect the compressor when air conditioning is not required.

It is an object of this invention to provide a simple inexpensive durable driving arrangement which will automatically provide a high compressor drive ratio at low engine speeds and a low compressor drive ratio at high engine speeds and also provides a simple method of disconnecting the compressor from the engine when refrigeration is not required.

It is another object of this invention to provide a driving arrangement in which an epicyclic transmission is electrically controlled to either disconnect the engine from the accessory drive or to provide accessory operation at a high drive ratio together with a centrifugal arrangement providing a direct drive when the engine speed is high.

These and other objects are attained in the form shown in the drawings in which the drive pulley is provided with an electromagnetic system which attracts the planet carrier or releases it. The planet pinions mesh with a stationary sun gear and a ring gear which is connected to the driven shaft which connects with the compressor mechanism. When the electromagnet is deenergized, the pulley rotates freely to declutch the driving engine from the driven shaft. When the electromagnet is energized, the planet carrier is connected to the drive pulley causing the ring gear to be rotated at a speed about one and a half times the speed of the drive pulley to drive the compressor at one and a half times the pulley speed. Pivoted centrifugal weights mounted upon the driven shaft are provided with the gear teeth which engage and rotate the gear teeth upon a rotary cam above a certain speed to cause the engagement of one plate of a ball ramp spreader reaction type clutch mechanism with a friction surface connected to the drive pulley. The balls are held in ramps on the clutch disk and the ring gear so as to cause a spreading reaction against opposed friction surfaces provided in a housing which is formed in conjunction with the drive pulley. The rotary cam also operates a switch to deenergize the electromagnet at this time so as to make possible the direct clutching between the drive pulley and the driven shaft through the ring gear.

Further objects and advantages of the present invention will be apparent from the following description, reference being had to the accompanying drawings wherein a preferred embodiment of the present invention is clearly shown.

In the drawings:

FIGURE 1 is a sectional view taken substantially along the line 1—1 of FIGURE 2 of a multispeed transmission and clutch embodying one form of my invention;

FIGURE 2 is a transverse vertical sectional view taken substantially along the line 2—2 of FIGURE 1;

FIGURE 3 is a transverse vertical sectional view taken substantially along the line 3—3 of FIGURE 1;

FIGURE 4 is a fragmentary sectional view taken substantially along the line 4—4 of FIGURE 1;

FIGURE 5 is a showing of the centrifugally actuated switch mechanism together with a simple wiring diagram; and FIGURE 6 is a fragmentary sectional view taken along the line 6—6 of FIGURE 2.

Referring now to the drawings and more particularly to FIGURE 1, there is shown for the purpose of illustrating my invention diagrammatically, the driving engine 20 of a motor vehicle which is connected through the pulley 22 and a belt 24 with a pulley 26 provided with a V groove for receiving the belt 24. The pulley 26 includes a sleeve portion 28 and an end plate 30 forming an enclosed housing. The pulley 26 has its outer portion formed of malleable iron or cast steel and an inner portion 32 also of malleable iron or cast steel in the form of a ring which is bonded to the outer portion by an intermediate ring 34 of some suitable brake lining material, such as epoxy resin containing asbestos fibers.

The inner ring 32 is mounted upon the outer ring 36 of a ball bearing 38 having its inner race 40 mounted upon a shoulder 42 of an extension 44 of the housing 46 of a refrigerant compressor. The extension 44 also includes an outer annular flange 48 and a cavity 50 containing an annular electromagnet coil 52 surrounding the inner portion of the extension 44. The outer portion of the pulley 26 has an annular projection 54 extending into the cavity 50 and the inner ring 32 also extends into the cavity 50 providing small magnetic gaps between the extension 44 and the two parts of the pulley 26. Within the pulley 26 is an annular shoulder 56. Within this annular shoulder 56 is an annular armature 58 which spans the annular brake lining material 34 and overlaps the inner ring 32 and the projection 54 of the pulley 26.

When the electromgnet coil 52 is deenergized, the pulley 26 will rotate freely without any connection with the compressor drive shaft 74 or the armature ring 58 which is free to rotate within the pulley 26. However, when the electromagnet coil 52 is energized, a magnetic circuit is set up around through the inner portion of the extension 44 across the magnetic gap through the inner ring 32 across the magnetic gap to the armature 58 and thence through the pulley 26 to the outer annular flange 48 of the extension 44. This attracts the armature 58 tightly to the pulley 26 so that it rotates with the pulley 26. The armature ring 58 carries three stub shafts 60, each carrying a planet gear 62. The planet gears 62 mesh with a sun gear 64 fixed upon the shoulder 66 of the extension 44 of the compressor housing 46. The planet gears 62 also mesh with an internal ring gear 68 connected by three diagonal spring strips 70 to a hub 72 fixed to the outer end of the driven shaft 74 extending into the interior of the housing 46 of the compressor to drive the compressor. Within the extension 44 is a shaft seal 73 for the shaft 74.

Therefore, when the electromagnet 52 is energized and the armature 58 is attracted to and held by the pulley 26, the stub shafts 60 and the planet gears 62 revolve about the sun gear 64 to drive the ring gear 68 a speed approximately one and a half times the speed of the pulley 26. Since the ring gear 68 is connected through the springs 70 to the hub 76 and through the hub 76 to the shaft 74, the shaft 74 of the compressor will be rotated at about one and a half times the speed of the pulley 26. For example, if the engine 20 is operating at 1000 r.p.m., the pulley 26 if driven at the same speed will likewise rotate at a 1000 r.p.m. while the shaft 74 will be rotated at 1500 r.p.m. If the engine 20 should operate at 3000 r.p.m. or higher, this would cause the shaft 74 to operate at 4500 r.p.m. or higher. This would be excessive speed for the compressor 46.

Therefore, according to my invention, I provide a clutching arrangement which will connect the pulley 26 directly to the drive shaft 74 so as to reduce the compressor speed at high engine speeds. According to this invention, a cross-shaped plate 76 is fastened onto the end of the shaft 74 by the nut 78 and the lock washer 80. The end of the shaft 74 is provided with a flat 82 thereon and the aperture of the plate 76 is likewise provided with a flat so as to prevent relative rotation between the plate 76 and the shaft 74. The plate 76 is provided with a pair of pivot pins 84. Pivotally mounted upon these pivot pins 84 are a pair of centrifugal weights 86. These centrifugal weights are normally urged toward a central position by the tension toggle springs 88 which extend between the anchoring pins 90 upon the plate 76 and the pins 92 upon the weights 86. The inner ends of the centrifugal weights 86 are each provided with four gear teeth 94 concentric with the pivot pins 84. These gear teeth are always in mesh with the gear teeth 96 upon a rotary cam 98 which is rotatably mounted upon the hub 72.

This rotatable cam 98 has an axially facing cam surface 121 in engagement with a complementary cam surface in the groove 123 on the inside of the spreader reaction clutch disk 125. This spreader reaction clutch disk 125 is resiliently connected by three tension spring connections 127 with the ring gear 68. The tension of the springs 127 holds three balls 129 in ramp type sockets 131 in the adjacent faces of the disk 125 and the ring gear 68. The movement of the centrifugal weights 86 to the extended position shown in FIGURE 2 rotates the rotatable cam 98 to a position in which the cooperating cam surfaces press the disk 125 against the annular shoulder 133 upon the closure disk 30. When the engagement is made, the sudden rotary force applied to the disk 125 causes it to rotate relatively to the ring gear 68 a small amount to cause a reaction between the balls 129 and the sockets 131 to spread the ring gear 68 and the disk 125 apart so that the ring gear 68 will now forcibly engage the shoulder 56 as the disk 125 is forced against the shoulder 133 to provide a direct clutching connection between the pulley 26 and the shaft 74 through the diagonal spring 70 and the hub 72.

The cam 135 on the opposite face of the rotary cam 98 has two surfaces 136, each of which at the time of clutching push one of the pins 137 extending through the hub 72 into engagement with a ring 139 which in turn engages a pin 141 extending through the sun gear 64 into operating engagement with the switch 143 which opens against the tension of the coil spring 145 to deenergize the coil 52. The coil spring 145 and the switch 143 are located within a hollow housing 144 of electrical insulating material surrounding the hub of the sun gear 64. The switch 143 is connected in series circuit between the coil 52 and the ground 147 upon the compressor 46. The deenergization of the coil 52 releases the armature 56 and allows the planet gears 62 to rotate freely so that the direct clutching action between the pulley 26 and the shaft 74 is permitted. As shown in FIGURE 5, a manual switch 149 is connected between the solenoid coil 52 and the battery 151 which is connected to a second ground 153. The opening of the switch 149 therefore manually deenergizes the coil 56 and provides for the declutching of the compressor shaft 74 from the pulley 26. This declutching action will take place at all times when the shaft 74 is operating below the speed at which the weights 86 are in their outermost positions. Thus, the switch 149 may be opened to effect a disconnection of the compressor before the car is operated or whenever the car operates at speeds below the speeds at which the centrifugal weights fly outwardly. The conductor 155 connecting the coil 52 and the switch 143 extends through the passage 157 and the milled cut 159 in the extension 144.

While the embodiment of the present invention as herein disclosed, constitutes a preferred form, it is to be understood that other forms might be adopted.

What is claimed is as follows:

1. A multispeed transmission and clutch including a first means, a second means, an epicyclic train having three elements, one of said elements being connected to the second means, a controllable connecting means for connecting and disconnecting said first means to and from a second element of said epicyclic train, means for holding the third element of said epicyclic train, and means responsive to a predetermined speed of one of said first and second means for clutching said first means to said second means and releasing one of said elements of said epicyclic train.

2. A multispeed transmission and clutch including a first means, a second means, an epicyclic train having three elements, one of said elements being connected to the second means, a controllable connecting means for connecting and disconnecting said first means to and from a second element of said epicyclic train, means for holding the third element of said epicyclic train, a centrifugal device mounted on one of said first and second means, friction clutch means operably connected to and operated by said centrifugal device for frictionally clutching said first means to said second means, and means operably connected to and operated by said centrifugal device for releasing one of said elements of said epicyclic train.

3. A multispeed transmission and clutch including a first transmititing means for transmitting a force, a second transmitting means for transmitting a force, a relatively stationary means, an epicyclic train having a sun element and a planet element and a ring element, an armature connected to one of said elements, an electromagnet magnetically associated with said first means and said armature for connecting said first means and said one element of said train, means connecting said second means and another element of said train, means connecting said relatively stationary means and another element of said train, means responsive to a predetermined speed of one of said means for clutching said first means to said second means, means responsive to the clutching of said first means to said second means for releasing one of said connections of one of said elements of said train, and means for controlling the energization of said electromagnet.

4. A multispeed transmission and clutch including a first transmitting means for transmitting a force, a second transmitting means for transmititng a force, a relatively stationary means, an epicyclic train having a sun element and a planet element and a ring element, an armature connected to one of said elements, an electromagnet magnetically associated with said first means and said armature for connecting said first means and said one element of said train, means connecting said second means and another element of said train, means connecting said relatively stationary means and another element of said train, means responsive to a predetermined speed of one of said means for clutching said first means to said second means, and means responsive to the clutching of said first means to said second means for deenergizing said electromagnet.

5. A multispeed transmission and clutch including a first transmitting means for transmitting a force, a second transmitting means for transmitting a force, a relatively stationary means, an epicyclic train having a sun element and a planet element and a ring element, an armature connected to one of said elements, an electromagnet magnetically associated with said first means and said armature for connecting said first means and said one element of said train, means connecitng said second means and another element of said train, means connecting said relatively stationary means and another element of said train, means responsive to a predetermined speed of one of said means for clutching said first means to said second means, means responsive to the clutching of said first means to said second means for deenergizing said electromagnet, and manual control means for deenergizing said electromagnet for declutching said first means from said second means.

6. A multispeed transmission and clutch including a first transmitting means for transmitting a force, a second transmitting means for transmitting a force, a relatively stationary means, an epicyclic gear train including a ring gear connected to said second means and a sun gear connected to said relatively stationary means and planet gears meshing with said sun gear and ring gear, a planet carrier for said planet gears, means for connecting and disconnecting said planet carrier to and from said first means, clutch means for clutching and declutching said first means to and from said second means, and a centrifugal device operably connected to said clutch means and responsive to the speed of said second means, said centrifugal device being provided with means for operating said clutch means to clutching position at high speeds and to declutching position at low speeds.

7. A multispeed transmission and clutch including a first means, a second means, a third means, an epicyclic gear train including a ring gear connected to said second means and a sun gear connected to said third means and planet gears meshing with said sun gear and ring gear, a planet carrier for said planet gears, means for connecting and disconnecting said planet carrier to and from said first means, a clutch means for clutching and declutching said first means to and from said second means, a cam means for operating said clutch means, and a centrifugal device responsive to the speed of said second means for operating said cam means.

8. A multispeed transmission and clutch including a bearing and bearing support, a pulley rotatably mounted upon said bearing, a shaft, a ring gear connected to said shaft, a sun gear connected to said bearing support, planet gears meshing with said ring gear and sun gear, a planet carrier for said planet gears, means for connecting and disconnecting said pulley and said planet carrier, a spreader reaction clutch mechanism operably connected to said ring gear for clutching said ring gear and said pulley, a rotatable axial cam means concentric with said shaft for controlling said clutch mechanism, and a centrifugal device responsive to the speed of said shaft for rotating said axial cam means for controlling said clutch mechanism.

9. A multispeed transmission and clutch including a first means, a second means, an epicyclic train having a planet element and second and third elements, said second element being connected to said second means, a controllable connecting means for connecting and disconnecting said first means to and from said planet element, means for holding the third element of said epicyclic train, and means responsive to a predetermined speed of one of said first and second means for clutching said first means to said second means and controlling said connecting means to disconnect said first means from said planet element.

10. A multispeed transmission and clutch including a first means, a second means, an epicyclic train having a planet element and second and third elements, said second element being connected to said second means, a controllable connecting means for connecting and disconnecting said first means to and from said planet element, means for holding the third element of said epicyclic train, a centrifugal device mounted on one of said means, clutch means connected to and operated by said centrifugal device for clutching said first means to said second means, and means operably connected to and operated by said centrifugal device for operating said connecting means to disconnect said first means from said planet element.

References Cited in the file of this patent

UNITED STATES PATENTS

| | | |
|---|---|---|
| 2,375,785 | Goode et al. | May 15, 1945 |
| 2,722,303 | Utz | Nov. 1, 1955 |
| 2,933,953 | Pasotti | Apr. 26, 1960 |